US009109151B2

(12) United States Patent
Gutiérrez et al.

(10) Patent No.: US 9,109,151 B2
(45) Date of Patent: Aug. 18, 2015

(54) PROCESS FOR PREPARING THERMALLY STABLE OIL-IN-WATER AND WATER-IN-OIL EMULSIONS

(75) Inventors: Xiomara Gutiérrez, Caracas (VE); Luis Marcano, Los Teques (VE); Migdalia Carrasquero, Los Teques (VE); Abel Ojeda, Carrizal (VE); José Blanco, San Antonio (VE); Hercilio José Rivas Siervo, Baruta (VE)

(73) Assignee: Intevep, S.A., Caracas (VE)

( * ) Notice: Subject to any disclaimer, the term of this patent is extended or adjusted under 35 U.S.C. 154(b) by 1583 days.

(21) Appl. No.: 12/179,623

(22) Filed: Jul. 25, 2008

(65) Prior Publication Data

US 2010/0022421 A1    Jan. 28, 2010

(51) Int. Cl.
| | | |
|---|---|---|
| B01F 17/34 | (2006.01) |
| C09K 8/28 | (2006.01) |
| C09K 8/26 | (2006.01) |
| C09K 8/36 | (2006.01) |
| C09K 8/64 | (2006.01) |
| C09K 8/68 | (2006.01) |

(52) U.S. Cl.
CPC .... C09K 8/36 (2013.01); C09K 8/28 (2013.01)

(58) Field of Classification Search
CPC .............. C09K 8/28; C09K 8/26; C09K 8/36; C09K 8/64; C09K 8/68; B01F 17/0021; A61K 8/06; A61K 8/062; A61K 8/064; A61K 8/066
USPC .............. 516/28, 75, 919; 507/137, 138, 263, 507/265
See application file for complete search history.

(56) References Cited

U.S. PATENT DOCUMENTS 3,085,889 A * 4/1963 Swift ............................ 106/219
3,527,581 A * 9/1970 Robbins et al. .................. 44/301
3,639,235 A * 2/1972 Karg ............................. 252/8.81

(Continued)

FOREIGN PATENT DOCUMENTS

EP      1 152 049 A2 *  7/2001
GB      2 169 220 A  *  7/1986

OTHER PUBLICATIONS

Derwent Abstract on EAST, week 201175, London: Derwent Publications Ltd., AN 2001-640790, EP 1152049 A2, (INTEVEP INC), abstract.*

*Primary Examiner* — Daniel S Metzmaier
(74) *Attorney, Agent, or Firm* — Bachman & LaPointe, P.C.

(57) ABSTRACT

A method for preparing a thermally stable well servicing fluid in the form of an oil-in-water (O/W) macroemulsion, a water-in-oil (W/O) macroemulsion or a water-in-oil (W/O) microemulsion at the well drilling location is provided. The servicing fluid is prepared by mixing a hydrocarbon phase, a water phase and a surfactant phase to obtain either an O/W macroemulsion, a W/O macroemulsion or a W/O microemulsion. The surfactant phase comprises a first surfactant and/or a second surfactant. The first surfactant comprises a fatty acid mixture and a hygroscopic first additive. The second surfactant comprises a C4-C6 alcohol. Whether or not an O/W macroemulsion, W/O macroemulsion or a W/O microemulsion is produced is determined by the concentration of the phases, the first surfactant, the second surfactant and the timing upon which the first additive, water phase and second surfactant are introduced to the mixture.

26 Claims, 5 Drawing Sheets

(56) References Cited

U.S. PATENT DOCUMENTS

| | | | | |
|---|---|---|---|---|
| 3,770,632 A | * | 11/1973 | Gilliam et al. | 507/259 |
| 3,804,760 A | * | 4/1974 | Darley | 507/240 |
| 4,337,241 A | | 6/1982 | Ser et al. | |
| 4,533,254 A | * | 8/1985 | Cook et al. | 366/176.1 |
| 4,547,232 A | * | 10/1985 | Cartwright | 149/2 |
| 4,744,796 A | * | 5/1988 | Hazbun et al. | 44/302 |
| 4,770,670 A | * | 9/1988 | Hazbun et al. | 44/301 |
| 5,360,458 A | * | 11/1994 | Forsberg et al. | 44/301 |
| 5,556,574 A | * | 9/1996 | Rivas et al. | 516/43 |
| 5,783,525 A | | 7/1998 | Blanco et al. | |
| 5,792,223 A | * | 8/1998 | Rivas et al. | 44/302 |
| 5,909,227 A | * | 6/1999 | Silverbrook | 347/3 |
| 5,993,495 A | * | 11/1999 | Sanchez et al. | 44/301 |
| 6,302,209 B1 | | 10/2001 | Thompson, Sr. et al. | |
| 7,148,183 B2 | | 12/2006 | Quintero | |
| 7,276,093 B1 | * | 10/2007 | Rivas et al. | 44/301 |
| 2004/0014609 A1 | * | 1/2004 | Dalmazzone et al. | 507/200 |
| 2004/0138069 A1 | * | 7/2004 | Kakadjian et al. | 507/111 |
| 2004/0229765 A1 | * | 11/2004 | Gutierrez et al. | 510/417 |
| 2005/0043555 A1 | * | 2/2005 | Garro et al. | 554/126 |
| 2005/0059556 A1 | * | 3/2005 | Munoz et al. | 507/103 |
| 2005/0075254 A1 | * | 4/2005 | Pollock et al. | 508/486 |

* cited by examiner

FIG. 5

PROCESS FOR PREPARING THERMALLY STABLE OIL-IN-WATER AND WATER-IN-OIL EMULSIONS

BACKGROUND OF THE INVENTION

The invention relates to well servicing fluids such as drilling mud, workover fluid, rehabilitation fluid, completion fluid, perforation fluid and the like, and to the on location preparation of thermally stable well servicing fluids, more specifically oil-in-water (O/W) macroemulsions, water-in-oil (W/O) macroemulsions and water-in-oil (W/O) microemulsions.

Various well-related activities such as drilling, completion, perforation, rehabilitation and the like involve the use of well servicing fluids for resolving typical problems related to the well including control of formation pressure, circulation of the cuttings out of the well, lubrication of the well equipment, and the like.

Problems frequently encountered include well servicing fluid stability at high temperatures and in the presence of salt typically encountered in downhole environments, formation damage that can be caused by loss of solids from the fluid into the formation, as well as the high cost and lower efficiency associated with the formation, storage and transport of O/W macroemulsions for drilling and W/O macroemulsions for completion.

The need remains for the efficient on location preparation of thermally stable O/W macroemulsions, W/O macroemulsions and W/O microemulsions that exhibit increased stability at elevated temperatures in the presence of salt and that exhibit a reduced tendency toward formation damage.

It is therefore the primary objective of the present invention to provide for an efficient preparation of O/W macroemulsions, W/O macroemulsions and W/O microemulsions which exhibit stability at high well operating temperatures.

It is a further object of the present invention to provide for an efficient preparation of O/W macroemulsions, W/O macroemulsions and W/O microemulsions which exhibit reduced tendency toward formation damage.

It is a further object of the present invention to provide for an efficient preparation of O/W macroemulsions, W/O macroemulsions and W/O microemulsions which exhibit an increased tolerance to saline environments.

It is a further object of the present invention to provide for an efficient preparation of O/W macroemulsions, W/O macroemulsions and W/O microemulsions by providing for surfactant mixture additives which accomplish the above objects of the present invention in terms of efficient on location preparation, thermal stability, saline tolerance and reduced formation damage.

It is a further object of the present invention to provide for versatile O/W macroemulsions, W/O macroemulsions and W/O microemulsions which may be employed in high-depth wells, such as marine bottom wells to low-depth wells.

It is a further object of the present invention to provide for cost effective O/W macroemulsions, W/O macroemulsions and W/O microemulsions.

Other objects and advantages of the present invention will appear below.

SUMMARY OF THE INVENTION

According to the present invention, the foregoing objects and advantages have been attained.

According to the invention, a method for preparing a thermally stable well servicing fluid in the form of an O/W macroemulsion, a W/O macroemulsion and a W/O microemulsion at the well drilling location is provided. The servicing fluid is prepared by mixing a hydrocarbon phase, a water phase, and a surfactant phase which comprises a first surfactant and/or a second surfactant. The phases are mixed to obtain either an O/W macroemulsion, a W/O macroemulsion or a W/O microemulsion. The first surfactant additive comprises a fatty acid mixture and a hygroscopic first additive. The second surfactant additive comprises a C4-C6 alcohol.

In accordance with the invention, whether or not an O/W macroemulsion or a W/O macroemulsion is produced is determined by the concentration of the first additive, wherein at least 0.25% by weight (w/w) of the first additive is used to obtain an O/W macroemulsion and less than about 0.13% w/w of the first additive is introduced to obtain a W/O macroemulsion.

In further accord with the invention, whether or not a W/O microemulsion is produced is determined by the timing the phases are introduced to the mixture and the concentrations of the first additive and the second surfactant, wherein at least 2% w/w of the first additive is introduced after the hydrocarbon phase and about 13% w/w of the fatty acid are mixed for a time of about 1 to 5 minutes, during continuous stirring, the water phase comprising at least 0.5% w/w to 2% w/w potassium chloride (KCl) is then introduced to the mixture followed by at least 4% w/w to about 4.7% w/w of the second surfactant in order to obtain a W/O microemulsion.

In further accordance with the invention, the thermally stable well servicing fluids in the form of an O/W macroemulsion at the well drilling location have been found to exhibit enhanced thermal stability up to about 350° F. and enhanced saline stability up to 5% w/w potassium chloride (KCl).

In further accordance with the invention, the thermally stable well servicing fluids in the form of a W/O macroemulsion at the well drilling location have been found to exhibit enhanced thermal stability up to about 280° F. and enhanced saline stability up to 2% w/w potassium chloride (KCl).

In further accordance with the invention, the thermally stable well servicing fluids in the form of a W/O microemulsion at the well drilling location have been found to exhibit enhanced thermal stability up to about 250° F. and enhanced saline stability up to 2% w/w potassium chloride (KCl).

BRIEF DESCRIPTION OF THE DRAWINGS

A detailed description of preferred embodiments of the invention follows, with reference to the attached drawings, wherein.

DETAILED DESCRIPTION

The invention relates to an efficient and cost effective method for preparing thermally stable well servicing fluids in the form of an O/W macroemulsion, a W/O macroemulsion or a W/O microemulsion wherein the method is carried out at the location where the emulsion is to be used, for example at a well to be treated with the emulsion, and more specifically at a well drilling location. The emulsions are created through the introduction of a surfactant phase comprising a first and/or second surfactant additive which will be discussed below. The additives may be used in varying concentrations to create an O/W macroemulsion, a W/O macroemulsion or a W/O microemulsion, each of which may be used advantageously in preparing well servicing fluids such as drilling muds, workover fluids, rehabilitation fluids, completion fluids, perforation fluids and the like.

In accordance with the invention, thermally stable well servicing fluids are provided having a fluid portion in the form of an oil-in-water macroemulsion, i.e. an emulsion of oil droplets in a dispersed water phase, a fluid portion in the form of a water-in-oil microemulsion or macroemulsion, i.e. emulsions of differing sized water droplets in a dispersed oil phase, and further including surfactant additives having specific concentrations and preparation parameters which have been found in accordance with the present invention to produce an O/W macroemulsion, a W/O macroemulsion or a W/O microemulsion with increased stability at elevated temperatures.

The first surfactant additive can include an ionized mixture of the fatty acid and a hygroscopic material such as monoethanolamine (MEA) and/or potassium hydroxide alkalines (KOH).

The second surfactant additive can include any C4 to C6 alcohol such as butanol, pentanol and hexanol.

Figure 1:
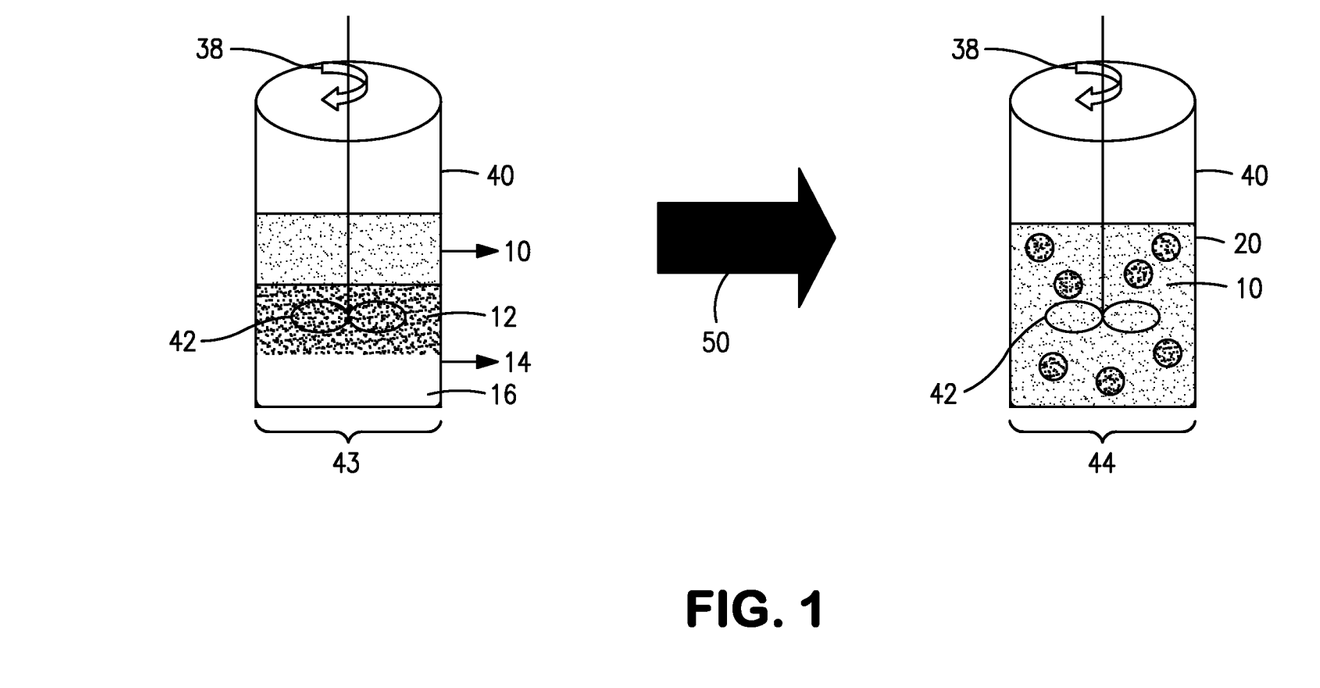
FIG. 1 schematically illustrates a method of forming the O/W macroemulsion of the present invention.

Referring to FIG. 1, a schematic illustration of a method of forming an O/W macroemulsion of the present invention is provided. As shown, emulsion mixing tank 40 receives the phases to be mixed, in this instance a solution 43 which incorporates the water phase 10, the hydrocarbon phase 12, and the first surfactant which includes an ionized mixture of fatty acid 14, and monoethanolamine (MEA) and/or potassium hydroxide alkalines (KOH) 16. Mixing tank 40 may be any appropriate mixing receptacle used within the art, such as a mixing tank, a mixing truck, etc.

Arrow 38 represents the speed in which the emulsion is mixed. This emulsion embodiment, an O/W macroemulsion, can be mixed at a speed of about 5000 to about 8000 rpm. The water phase 10 maybe any suitable water. The hydrocarbon phase 12 may be any suitable oil, such as mineral oil or fuel oil. The hydrocarbon phase is preferably paraffinic oil also known as VASSA™ LP Serie oils produced by Aceites y Solventes Venezolanos, S. A. VASSA. In the embodiment where the first surfactant incorporates a fatty acid mixture 14 of any C16-C22 fatty acid, the fatty acid concentration can be added to the O/W macroemulsion in the amount of about 1.0% w/w to about 2% w/w, preferably 1.5% w/w. Any suitable C12-C22 fatty acid may be used, preferably tall oil fatty acid (TOFA). The first surfactant also incorporates monoethonalamine (MEA) and/or potassium hydroxide alkalines (KOH) 16.

An O/W macroemulsion is created in FIG. 1 through the addition of MEA and/or KOH in solution 43 in the amount of about 0.25 to about 1.2% w/w. Solution 43 containing the water phase 10, the hydrocarbon phase 12, the fatty acid mixture 14, and the MEA and/or KOH 16 can be stirred 38 at an rpm of about 5000 to about 8000 by stirring device 42 for at least 10 minutes 50. The stirring device may be any stirring device that is well known within the art that will successfully mix the volume of emulsion that is desired at a rpm of about 5000 to about 8000. Arrow 50 represents a mixing time of at least 10 minutes.

Following the above procedure in a system as schematically illustrated in FIG. 1, a stable O/W macroemulsion 44 is created. O/W macroemulsion 44 includes a continuous water phase 10 and a hydrocarbon/first surfactant 20 dispersed through the continuous water phase 10. The hydrocarbon/first surfactant 20 is a mixture of the hydrocarbon phase 12, the fatty acid mixture at a concentration of about 1.0% w/w to about 2% w/w 14, and the MEA and/or KOH 16. The hydrocarbon/first surfactant 20 are about 1 μm to about 10 μm sized droplets dispersed within the water phase 10.

Table 1 details the formation of the O/W macroemulsion droplet size as the concentration of MEA is varied from 0.25% w/w to 0.5% w/w.

TABLE 1

| % TOFA (w/w) | % MEA (w/w) (0% KCl) | Type of emulsion | Mean Droplet Diameter (micron) |
|---|---|---|---|
| 1.5 | 0.25 | O/W | 10.0 |
|  | 0.3 | O/W | 8.6 |
|  | 0.4 | O/W | 5.4 |
|  | 0.5 | O/W | 3.5 |

The O/W macroemulsions of Table 1 were formulated with a ratio of oil:water of 70:30 w/w, with diesel oil as the hydrocarbon phase and with tallow fatty acid as the fatty acid phase.

Table 1 illustrates that the formation of the O/W macroemulsion with a concentration of 0.5% w/w MEA yields the smallest diameter droplet.

In Table 2, the O/W macroemulsion containing MEA at a concentration of 0.5% w/w with a mean droplet diameter of 3.5 μm was used to test the stability of the O/W macroemulsion at varying KCl salinities.

TABLE 2

| % TOFA (w/w) | % KCl (w/w) (0.5% MEA) | Type of macroemulsion | Mean Droplet Diameter (micron) |
|---|---|---|---|
| 1.5 | 0.5 | O/W | 2.21 |
|  | 1.0 | O/W | 5.19 |
|  | 1.5 | O/W | 7.25 |
|  | 2.0 | O/W | 9.98 |
|  | 3.0 | O/W | 10.04 |
|  | 4.0 | O/W | 9.95 |
|  | 5.0 | O/W | 10.00 |

Table 2 indicates that the O/W macroemulsion of the present invention will form and is stable up to a salinity concentration of about 5.0% w/w KCl.

Figure 2:
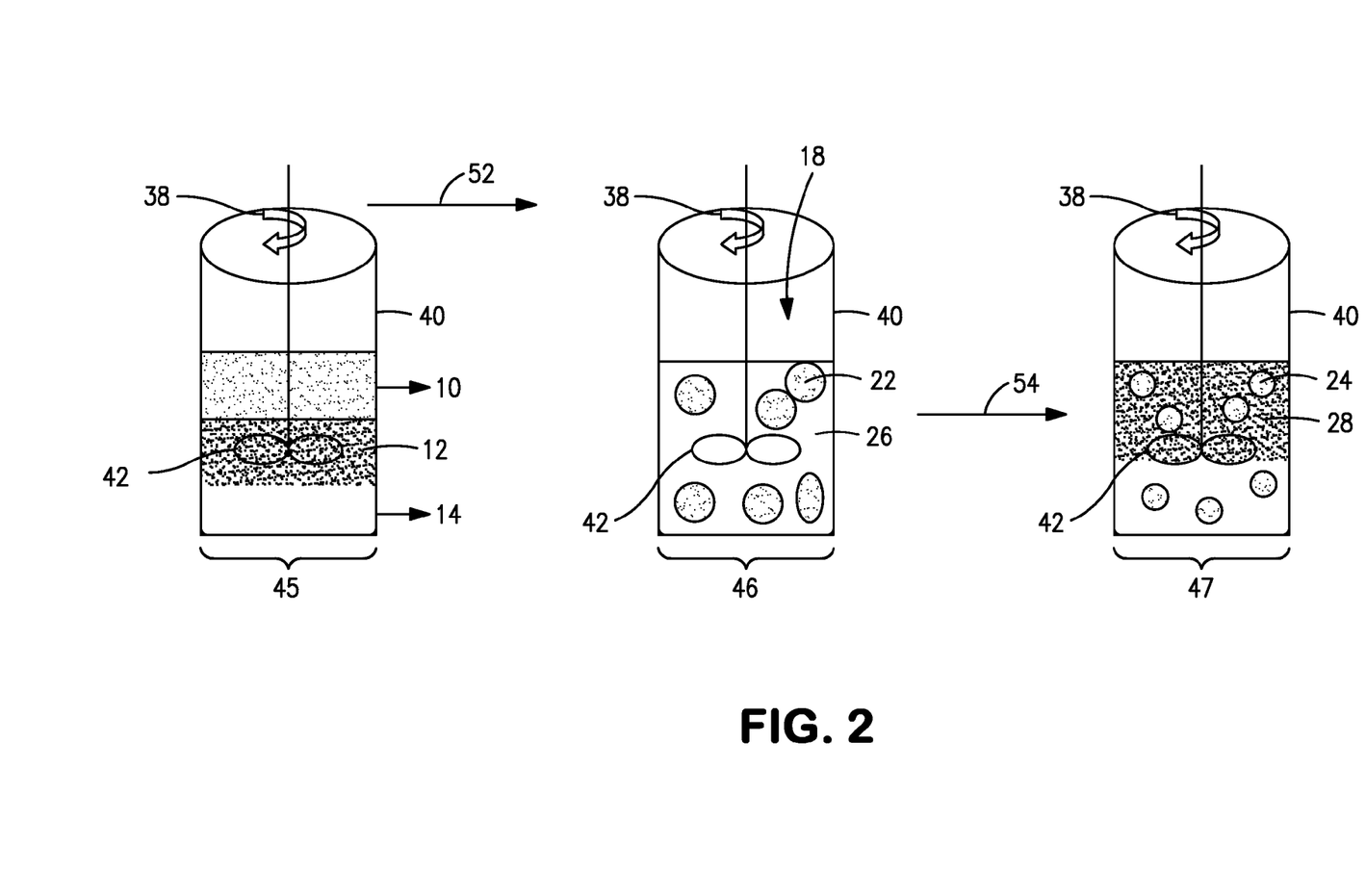
FIG. 2 schematically illustrates a method of forming the W/O macroemulsion of the present invention.

Referring to FIG. 2, a schematic illustration of a method of forming a W/O macroemulsion of the present invention is provided. As shown, in this method emulsion mixing tank 40 receives a solution 45 which incorporates the water phase 10, the hydrocarbon phase 12, the fatty acid 14 and the MEA at a concentration of less than 0.13% w/w 18. Mixing tank 40 may be any appropriate mixing receptacle used within the art, such as a mixing tank, a mixing truck, etc. Arrow 38 represents the speed in which the emulsion is mixed. This emulsion embodiment can be mixed at a speed of about 5000 to about 8000 rpm. The water phase 10 may be any suitable water. The hydrocarbon phase 12 may be any suitable oil, such as mineral oil or fuel oil. The hydrocarbon phase is preferably paraffinic oil also known as VASSA™ oil. The fatty acid mixture 14 may be any C16-C22 fatty acid. The fatty acid concentration is added to the emulsion in the amount of about 1.5% w/w to about 2% w/w. Any suitable C12-C22 fatty acid may be used, preferably tall oil fatty acid.

After the water phase 10, hydrocarbon phase 12, the fatty acid mixture 14 and the MEA at a concentration of less than 0.13% w/w 18 are added to mixing tank 40 in FIG. 2, the solution 45 is stirred by stirrer 42 at an rpm of about 5000 to about 8000 38 for at least 10 minutes 54. After solution 45 is stirred by stirrer 42 at an rpm of about 5000 to about 8000 38 for at least 10 minutes.

Following this method as schematically illustrated in FIG. 2, a stable W/O macroemulsion 47 was created. W/O macroemulsion 47 includes a continuous hydrocarbon phase/first surfactant 28 and a water phase 24 dispersed through the continuous hydrocarbon phase/first surfactant 28. The hydrocarbon phase/first surfactant 28 is a mixture of the hydrocarbon phase 12, the fatty acid mixture 14, and the MEA at a concentration of less than 0.13% w/w 18. The water phase 24 is about 1 μm to about 10 μm sized droplets suspended within the hydrocarbon phase/first surfactant 28.

Table 3 details the formation of the W/O macroemulsion droplet size as the concentration of MEA is varied from 0.067% w/w to 0.2% w/w in the presence of about 0.5% w/w KCl.

TABLE 3

| % TOFA (w/w) | Macroemulsion formulation % MEA (w/w), (0.5% w/w KCl) | Type of macroemulsion | Mean Droplet Diameter (micron) |
|---|---|---|---|
| 1.5 | 0.067 | W/O | 2-3 |
| | 0.1 | W/O | 2-3 |
| | 0.13 | W/O | 2-3 |
| | 0.167 | W/O | 2-3 |
| | 0.2 | W/O | 2-3 |

The W/O macroemulsions of Table 3 were formulated with a ratio of oil:water of 70:30 w/w, with paraffinic oil as the hydrocarbon phase and with tallow fatty acid as the fatty acid phase.

Table 3 illustrates that the formation of the W/O macroemulsion with a concentration interval of between 0.067% w/w to 0.2% w/w MEA yields a W/O macroemulsion with predominantly the same sized small diameter droplets that are stable in a 0.5% w/w KCl environment. Further testing has indicated that the W/O macroemulsion is stable up to about 2% w/w KCL environment.

Figure 3:
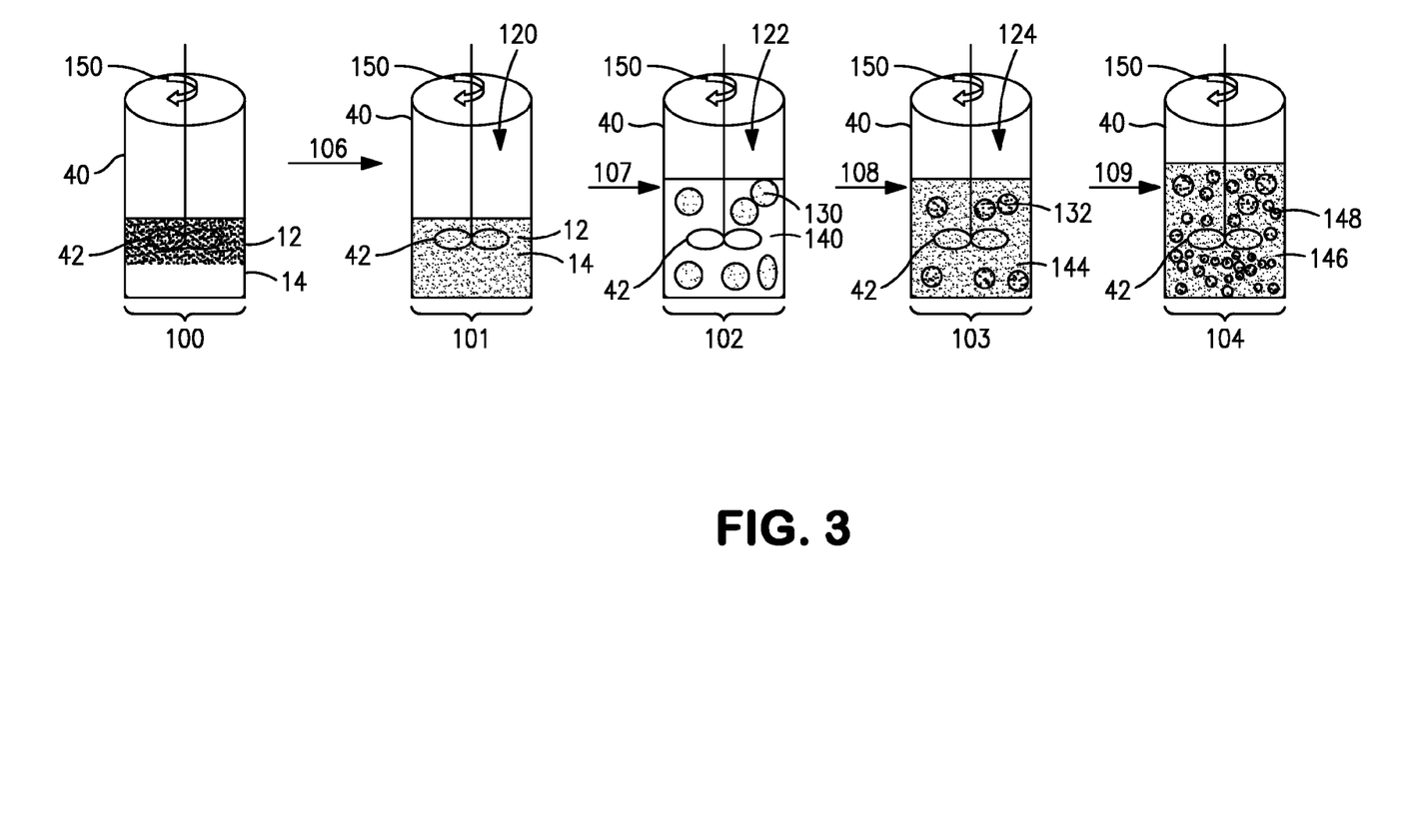
FIG. 3 schematically illustrates a method of forming the W/O microemulsion of the present invention.

Referring to FIG. 3, a schematic illustration of a method of forming a W/O microemulsion of the present invention is provided. As shown, following this method, emulsion mixing tank 40 receives a solution 100 which incorporates the hydrocarbon phase 12 and the fatty acid 14. Mixing tank 40 may be any appropriate mixing receptacle used within the art, such as a mixing tank, a mixing truck, etc. Arrow 150 represents the speed in which the emulsion is mixed. This emulsion embodiment can be mixed at a speed of about 400 to about 500 rpm. The hydrocarbon phase 12 may be any suitable oil, such as mineral oil or fuel oil. The hydrocarbon phase is preferably fuel oil, such as diesel. The fatty acid mixture 14 may be any C16-C22 fatty acid. The fatty acid concentration is added to the emulsion in the amount of about 10% w/w to about 14% w/w. Any suitable C12-C22 fatty acid may be used, preferably tall oil fatty acid.

After the hydrocarbon phase 12 and the fatty acid mixture 14 are added to mixing tank 40 in FIG. 3, the solution 100 is stirred by stirrer 42 at an rpm of about 400 to about 500 150 for at least 3 to 5 minutes 106. After solution 100 is stirred by stirrer 42 at an rpm of about 400 to about 500 150 for at least 3 to 5 minutes, while continuously stirring, MEA at a concentration of at least 2% w/w to about 2.7% w/w 120 is added to solution 100.

Intermediate mixture 101 containing the hydrocarbon phase 12, the fatty acid mixture 14 and the first additive 120 are continually stirred by stirrer 42 at an rpm of about 400 to about 500 150 for at least another 1 to 3 minutes 107 before the water phase containing a concentration of at least 0.5% w/w to 2.0% w/w KCl 122 is added to solution 101.

Table 4 details the KCl concentration of the W/O microemulsion water phase.

TABLE 4

| % H$_2$O (w/w) | % KCl (w/w) | *TURBIDITY (NTU) |
|---|---|---|
| 10 | 0.50 | 4.37 |
| 10 | 1.00 | 3.82 |
| 20 | | 6.2 |
| 30 | | 198 |
| 10 | 1.50 | 4.97 |
| 20 | | 9.51 |
| 30 | | 10.4 |
| 40 | | 18.8 |
| 10 | 2.00 | 5.34 |
| 20 | | 7.42 |
| 30 | | 19.3 |
| 40 | | 13 |

*Turbidity is a measurement to determine the transparency of an emulsion. NTU, i.e. Nephelometric Turbidity Units, are used to measure the transparency of the emulsion.

A microemulsion is measured by its transparency and has a turbidity of less than or equal to 200 NTU. Table 4 indicates that since all resultant values of turbidity are lower than 200 NTU, the W/O microemulsion of the present invention can be formed in a varying interval of salinity, 0.5% w/w to 2% w/w KCl, and a varying volume of water, 10% w/w to 40% w/w.

Returning to FIG. 3, creation of an intermediate dispersion 102 containing large water phase droplets 130 dispersed within a continuous solution of hydrocarbon phase/first surfactant 140 is shown. The hydrocarbon phase/first surfactant 140 is a mixture of the hydrocarbon phase 12, the fatty acid mixture 14, and the MEA at a concentration of at least 2% w/w 18. After intermediate dispersion 102 is continually stirred by stirrer 42 at an rpm of about 400 to about 500 150 for at least another 1 to minutes 108 a second surfactant at a concentration at least about 4% w/w to about 4.7% w/w 124 is added to solution 102. The second surfactant may be any C4-C6 alcohol, such as butanol, pentanol and hexanol.

Intermediate emulsion 103 containing smaller water phase droplets 132 dispersed within a continuous solution of hydrocarbon phase/first surfactant/second surfactant 144 is created in FIG. 3. The hydrocarbon phase/first surfactant/second surfactant 144 is a mixture of the hydrocarbon phase 12, the fatty acid mixture 14, the MEA at a concentration of at least 2% w/w 18 and a C4-C6 alcohol at a concentration of at least 4%. Intermediate emulsion 103 is continually stirred for at least 5 minutes 109 by stirrer 42 at an rpm of about 400 to about 500 150.

Following the above method and using a system as schematically illustrated in FIG. 3, a stable W/O microemulsion 104 is created. W/O microemulsion 104 includes a continuous hydrocarbon phase/first surfactant/second surfactant 146 and water phase droplets 148 dispersed through the continuous hydrocarbon phase/first surfactant/second surfactant 146. The hydrocarbon phase/first surfactant/second surfactant 146 is a mixture of the hydrocarbon phase 12, the fatty acid mixture 14, the MEA at a concentration of at least 2% w/w 18 and a C4-C6 alcohol at a concentration of at least 4%. The water phase droplets 148 are about 100 Å to about 700 Å (Angstrom) sized droplets suspended within the hydrocarbon phase/first surfactant/second surfactant 146.

Figure 4:
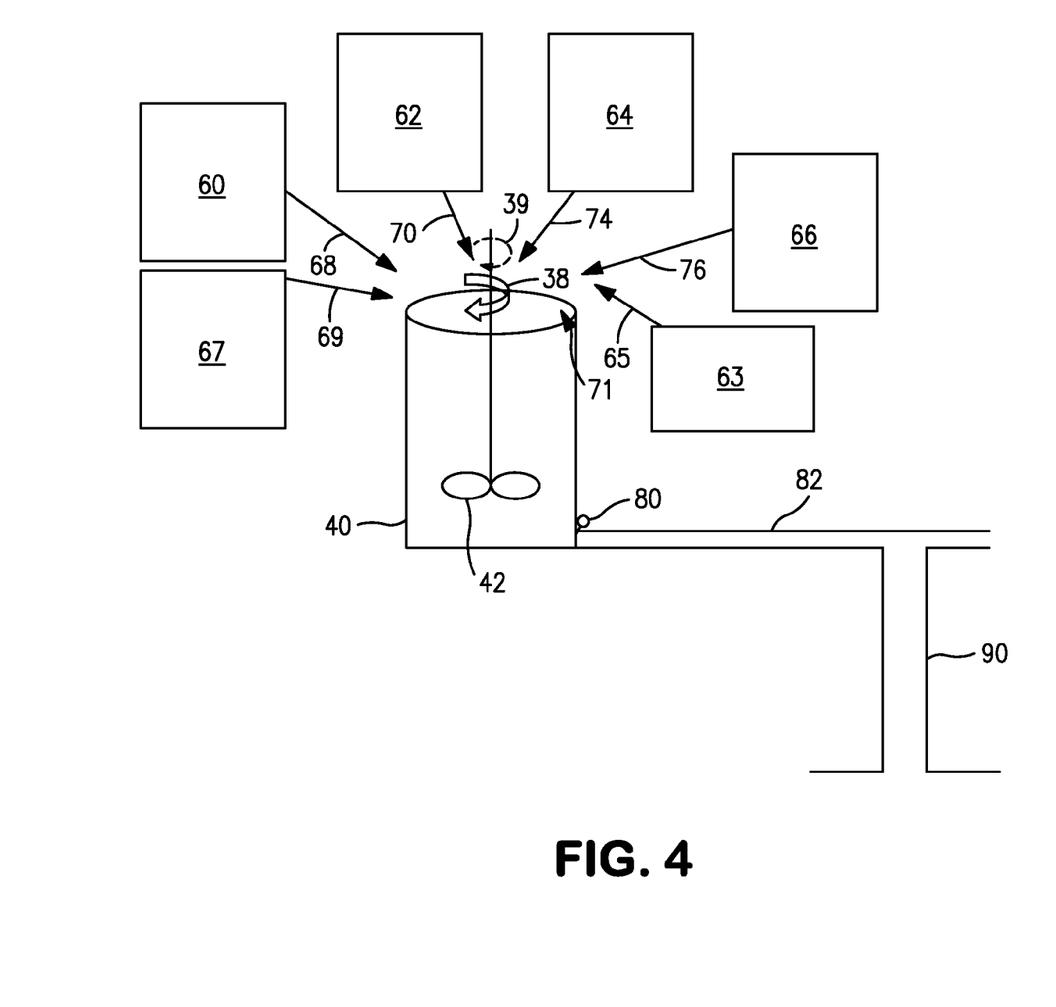
FIG. 4 schematically illustrates a method of forming either the O/W macroemulsion, the W/O macroemulsion or the W/O microemulsion at the drill location.

Referring to FIG. 4, schematic illustration of one method of forming W/O macroemulsions, O/W macroemulsions and/or W/O microemulsions according to the present invention, at the well drilling location, is provided. As shown emulsion mixing tank 40 is located at the well drilling site and can be attached to the well 90 by servicing pipe 82. The mixing tank 40 is separated from the well servicing pipe by valve 80. As stated above, mixing tank 40 may be any suitable mixing receptacle, such as a truck, a tank etc., that is well known within the art. Servicing pipe 82 may be any device, pipe or method of transportation that is suitable for the transport of well servicing fluids to the well. Valve 80 may be any suitable valve for controlling the flow of fluids.

FIG. 4 by way of example shows six separate containers housing the emulsion constituents of the present invention. Housing or source 60 contains the hydrocarbon phase, source 62 contains the fatty acid mixture, source 64 contains the MEA and/or KOH, source 67 contains the C4-C6 alcohol, source 63 contains the KCl and source 66 contains the water. The desired amounts and concentrations of the hydrocarbon phase, the fatty acid mixture, the MEA and/or KOH, the KCl, the C4-C6 alcohol and the water depend upon the phase (O/W or W/O) of the macro or micro emulsion to be made and the volume of emulsion to be made.

The O/W macroemulsion created may contain a ratio of oil:water in the range of about 70:30 w/w, about 60:40 w/w and about 50:50 w/w. The W/O macroemulsion created may contain a ratio of oil:water in the range of about 60:40 w/w, about 70:30 w/w, about 80:20 w/w and about 90:10 w/w. The W/O microemulsion created may contain a ratio of oil:water in the range of about 60:40 w/w, about 70:30 w/w, about 80:20 w/w and about 90:10 w/w. To obtain the O/W or W/O macroemulsions, the fatty acid mixture is added at a volume that will produce a resultant well servicing fluid fatty acid concentration of about 1% w/w to about 2% w/w. To obtain the W/O microemulsion, the fatty acid mixture is added at a volume that will produce a resultant well servicing fluid fatty acid concentration of about 10% w/w to about 14% w/w. The MEA and/or KOH is also added at a volume dependent upon which phase of emulsion that is to be created. If an O/W macroemulsion is to be created MEA and/or KOH is added at a volume that will produce a resultant well servicing fluid MEA and/or KOH concentration of about 0.25% w/w to about 1.2% w/w. If a W/O macroemulsion is to be created, MEA is added at the correct time throughout the procedure at a volume that will produce a resultant well servicing fluid MEA concentration of less than 0.13% w/w. If a W/O microemulsion is to be created MEA is added at the correct time at a volume that will produce a resultant well servicing fluid MEA concentration of about 2% w/w to about 2.7% w/w. The water phase of the emulsions is added at a volume that will produce a resultant well servicing fluid water phase concentration of the ratios presented above. The C4-C6 alcohol phase is added to the W/O microemulsion at a volume that will produce a resultant well servicing fluid C4-C6 alcohol concentration of at least 4% w/w.

The schematic of FIG. 4 will be illustrated by the following examples:

EXAMPLE 1

To create an O/W macroemulsion, water from source 66 is added by any method 76 which is well known within the art to mixing tank 40, hydrocarbon from source 60 is added by any method 68 which is well known within the art to mixing tank 40, the fatty acid mixture from source 62 is added at a concentration in the amount of about 1% w/w to about 2% w/w by any method 70 which is well known within the art to mixing tank 40, and the MEA and/or KOH from source 64 is added at a concentration in the amount of about 0.25% w/w to about 1.2% w/w by any method 74 which is well known within the art to mixing tank 40. Mixing tank 40 containing the water phase, the hydrocarbon phase, the fatty acid mixture at a concentration of about 1% w/w to about 2% w/w, and the MEA and/or KOH is stirred (see arrow 38) at an rpm of about 5000 to about 8000 by stirring device 42 for at least 10 minutes. A stable O/W macroemulsion is created in mixing tank 40 which includes a continuous water phase and a hydrocarbon phase/first surfactant of about 1 to about 10 μm sized droplets dispersed within the continuous water phase. Once the desired O/W macroemulsion is created control valve 80 is opened releasing the emulsion into well servicing fluid pipe 82 which transports the O/W macroemulsion to well 90.

EXAMPLE 2

To create a W/O macroemulsion, water from source 66 is added by any method 76 which is well known within the art to mixing tank 40, hydrocarbon from source 60 is added by any method 68 which is well known within the art to mixing tank 40, the fatty acid mixture from source 62 is added at a concentration in the amount of about 1.5% w/w to about 2% w/w by any method 70 which is well known within the art to mixing tank 40, and MEA from source 64 is added at a concentration in the amount of less than 0.13% w/w by any method 74 which is well known within the art to mixing tank 40. The contents of mixing tank 40 are stirred by stirrer 42 at an rpm 38 of about 5000 to about 8000 for at least 10 minutes. A stable W/O macroemulsion is created which includes a continuous hydrocarbon phase/first surfactant and a water phase of about 1 to about 10 μm sized droplets dispersed through the continuous hydrocarbon phase/first surfactant. Once the desired W/O macroemulsion is created control valve 80 is opened releasing the emulsion into well servicing fluid pipe 82 which transports the W/O macroemulsion to well 90.

EXAMPLE 3

To create a W/O microemulsion, hydrocarbon from source 60 is added by any method 68 which is well known within the art to mixing tank 40 and the fatty acid mixture from source 62 is added at a concentration in the amount of about 10% w/w to about 14% w/w by any method 70 which is well known within the art to mixing tank 40. The contents of mixing tank 40 are stirred by stirrer 42 at an alternate rpm, see arrow 39, of about 400 to about 500 for at least 3 to 5 minutes. After the solution is stirred by stirrer 42 at an rpm of about 400 to about 500 39 for at least 3 to 5 minutes, MEA from source 64 is added during continuous stirring at a concentration in the amount of about 2% w/w to about 2.7% w/w by any method 74 which is well known within the art to mixing tank 40. After the solution is stirred by stirrer 42 at an rpm of about 400 to about 500 39 for at least another 1 to 3 minutes, water from source 66 is mixed with continuous stirring at a concentration of about 10% w/w to 40% w/w. KCl is added by any method 76 which is well known within the art from source 63 at a concentration of about 0.5% w/w to about 2.0% w/w. The KCl is added to the water from source 66 by any method 65 which is well known in the art to create a KCl/water phase 71 that is added by any method that is well known within the art to mixing tank 40. After mixing tank 40 is continuously stirred by stirrer 42 at an rpm of about 400 to about 500 39 for at least an additional 1 to 5 minutes, during continuous stirring, C4-C6 alcohol from source 67 at a concentration of at least 4% is added by any method which is well know within the art 69 to mixing tank 40. Mixing tank 40 continues to be stirred by stirrer 42 at an rpm of about 400 to about 500 39 for at least an additional 5 minutes.

A stable W/O microemulsion is created which includes a continuous hydrocarbon phase/first surfactant/second surfactant and a water phase of about 100 Å to about 700 Å sized droplets dispersed throughout the continuous hydrocarbon phase/first surfactant/second surfactant. Once the desired W/O microemulsion is created, control valve 80 is opened releasing the emulsion into well servicing fluid pipe 82 which transports the W/O microemulsion to well 90.

The discussion of FIG. 4 refers to sources of various starting materials. These sources can be pipes or other flow conduits for providing a flow of the ingredients, or they can also be vats, tanks or other containers of the relevant fluid or liquid.

These vats or tanks containing the emulsion constituents may be located on the well drilling site. It is understood that the schematic method illustrated in FIG. 4 is an example of a method employed to create the O/W macroemulsion, the W/O macroemulsion and the W/O microemulsion at the well drilling site. Alternate methods of creating the emulsions of this invention on the well drilling site may be employed. For instance, the emulsion constituents may be housed in vats and mixed in a well servicing truck or the emulsion constituents may be directly piped into a mixing tank that is connected to the well. The emulsions of the present invention may be prepared on the location of use, such as on the well to be treated on the drilling site, by any method that is well known within the chemical, solution and well drilling arts.

Figure 5:
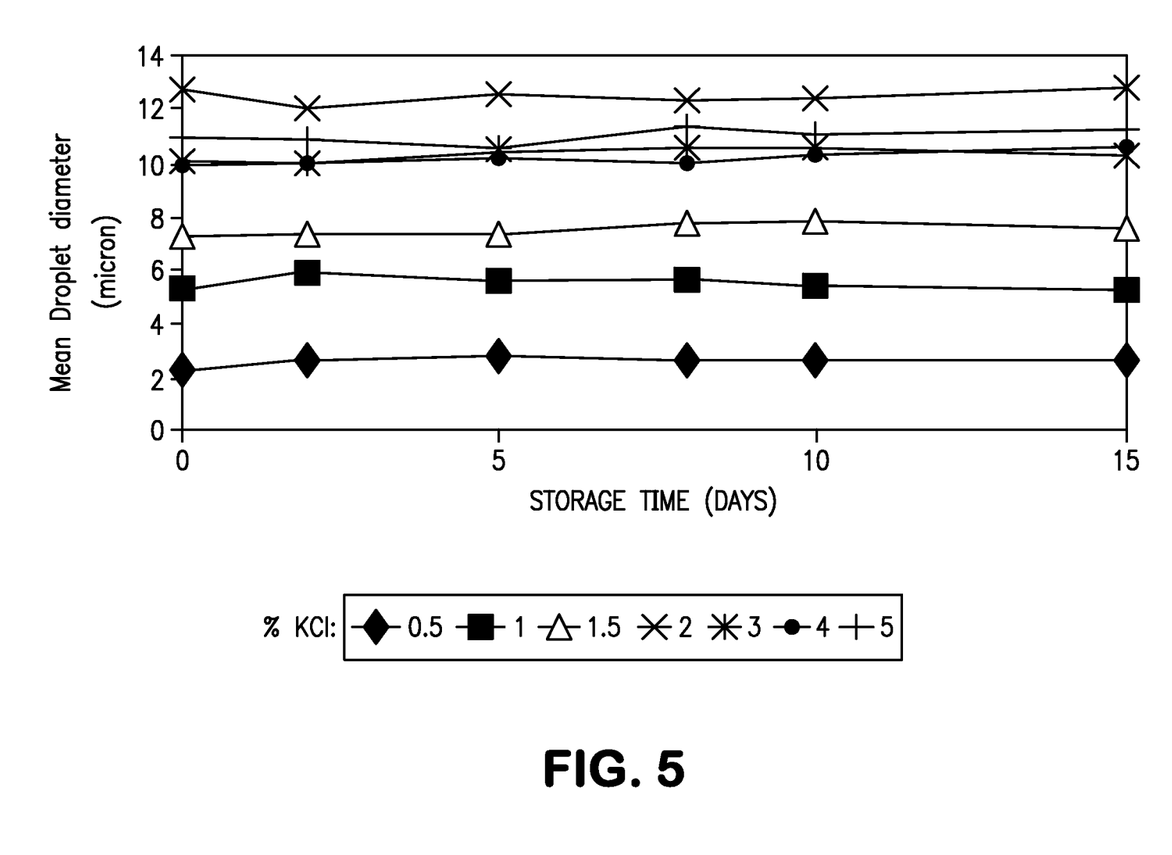
FIG. 5 graphically depicts the static stability as a function of salinity, time and temperature of the O/W macroemulsion.

The emulsions prepared in this invention showed excellent properties as well servicing rehabilitation fluids, completion fluids and perforation fluids. As shown in Table 2 and FIG. 5, the O/W macroemulsion exhibits a high degree of stability in saline environments of up to a concentration of about 5% w/w potassium chloride (KCl). The results plotted in FIG. 5 were established by storing the O/W macroemulsion containing MEA at a concentration of 0.5% w/w for 15 days at 40° C.

The W/O macroemulsion showed a stability in saline environments of up to a concentration of about 2% w/w KCl, and the W/O microemulsion showed a high degree of stability in saline environments of up to a concentration of about 2% w/w KCl, see Table 4.

The dynamic stability of the emulsions of the present invention were tested by exposure to continuous low intensity rotary movement while aging the emulsion at high temperatures for a period of 16 hours. Analysis of droplet diameters and rheologic behavior are made at time zero through time 16 hours.

Table 5 shows the dynamic stability of the O/W macroemulsion as a function of time, temperature and KCl concentration.

TABLE 5

| % KCl (w/w) | T = 200° F. | | T = 250° F. | | T = 300° F. | | T = 350° F. | |
|---|---|---|---|---|---|---|---|---|
| | BA* *Dg (micron) | AA* Dg (micron) | BA Dg (micron) | AA Dg (micron) | BA Dg (micron) | AA Dg (micron) | BA Dg (micron) | AA Dg (micron) |
| 0.5 | 2.21 | 2.26 | 2.72 | 3.18 | 2.14 | 2.5 | 2.36 | 3.39 |
| 1.0 | 5.19 | 6.44 | 4.73 | 5.19 | 4.57 | 2.48 | 4.41 | 1.54 |
| 1.5 | 7.25 | 7.93 | 7.93 | 7.83 | 6.77 | 2.09 | 7.21 | 1.61 |
| 2.0 | 12.70 | 13.97 | 12.56 | 13.2 | 11.66 | 4.19 | 9.94 | 8.15 |
| 3.0 | 10.04 | 10.18 | 9.94 | 11.67 | 11.47 | 2.73 | 10.2 | unstable |
| 4.0 | 9.95 | 2.8 | 11.13 | 22.29 | 10.04 | 3.39 | 9.87 | unstable |
| 5.0 | 10.86 | 7.43 | 10.61 | 20.97 | 10.56 | unstable | 10.3 | unstable |

*BA: Before aging
*AA: After aging
*Dg: Diameter of drop

The O/W macroemulsion of Table 5 was formulated with a ratio of oil:water of 30:70 w/w, with 0.5% w/w MEA and with 1.5% w/w tallow fatty acid as the fatty acid phase. The duration of the test in Table 5 was 16 hours at a pressure of 150 psi.

The results of Table 5 show that the O/W macroemulsion of the present invention is stable in a dynamically large temperature range and salinity. At a temperature of 200° F. further testing revealed that the O/W macroemulsion of the present invention exhibited a formation damage of 3.95% when the tests were run with crude oil properties of 11° API and a permeability of 250 mD (millidarcy).

Therefore, the O/W macroemulsion of the present invention shows a high thermal stability of up to about 350° F., a formation damage of less than about 4% under dynamic well conditions including downhole well pressures and high stability in the presence of varying saline concentrations.

Table 6 shows the dynamic stability of the W/O macroemulsion as a function of time, temperature, KCl concentration and MEA concentration

TABLE 6

| W/O Macroemulsion with 1.5% w/w TOFA & 0.5% w/w KCl % MEA (w/w) | Temperature of Aging (° F.) | | | |
|---|---|---|---|---|
| | 250° F. | | 280° F. | |
| | *Dg (micron) Before Aging | Dg (micron) After aging | Dg (micron) Before Aging | Dg (micron) After aging |
| 0.067 | 2-3 | 2-3 | 2-3 | 2-3 |
| 0.1 | 2-3 | 2-3 | 2-3 | 2-3 |
| 0.13 | 2-3 | 2-3 | 2-3 | 2-3 |
| 0.167 | 2-3 | Reversed | 2-3 | Reversed O/W |

TABLE 6-continued

| W/O Macroemulsion with 1.5% w/w TOFA & 0.5% w/w KCl % MEA (w/w) | Temperature of Aging (° F.) | | | |
| --- | --- | --- | --- | --- |
| | 250° F. | | 280° F. | |
| | *Dg (micron) Before Aging | Dg (micron) After aging | Dg (micron) Before aging | Dg (micron) After aging |
| 0.2 | 2-3 | O/W macroemulsion (7.5 micron) Reversed O/W macroemulsion (8.5 micron) | 2-3 | macroemulsion (8.5 micron) Reversed O/W macroemulsion (7.4 micron) |

*Dg: Diameter of drop

The W/O macroemulsion of Table 6 was formulated with a ratio of oil:water of 30:70 w/w and with 1.5% w/w tallow fatty acid as the fatty acid phase in the presence of 0.5% KCl. The duration of the test in Table 6 was 16 hours at a pressure of 150 psi.

The results of Table 6 show that the W/O macroemulsion of the present invention is dynamically stable within the MEA concentration of 0.067% w/w to 0.13% w/w. The W/O macroemulsion is dependent upon the MEA concentration. After aging, if the MEA concentration is between 0.13% w/w and 0.167% w/w the emulsion will reverse to an O/W macroemulsion.

Table 6 also shows that the W/O macroemulsion of the present invention has a high thermal stability of up to 280° F. Further testing also reveals that the W/O macroemulsion of the present invention exhibits a formation damage of 6.45% when the tests were run with crude oil of 11° API and a permeability of 250 mD.

Therefore, the W/O macroemulsion of the present invention shows a high thermal stability of up to about 280° F., a formation damage of less than about 7% under dynamic well conditions including downhole well pressures and high stability in the presence of up to about 2% w/w saline concentrations.

Table 7 shows the dynamic stability of the W/O microemulsion as a function of time, temperature, KCl concentration and water volume.

TABLE 7

| | | Temperature of Aging (° F.) | | | |
| --- | --- | --- | --- | --- | --- |
| | | 180 | | 250 | |
| % H$_2$O (w/w) | % KCl (w/w) | Turbidity (NTU) Before Aging | Turbidity (NTU) After Aging | Turbidity (NTU) Before Aging | Turbidity (NTU) After Aging |
| 10 | 0.5 | 3.61 | 4.75 | 3.31 | 5.59 |
| 10 | 1 | 4.51 | 4.64 | 4.42 | 8.46 |
| 20 | | 6.11 | 9.54 | 7.28 | 7.33 |
| 30 | | 12.6 | 16.5 | 13 | 15.6 |
| 10 | 1.5 | 6.01 | 6.75 | 5.89 | 7.19 |
| 20 | | 4.78 | 10.2 | 8.35 | 10.1 |
| 30 | | 13.2 | 9.99 | 13.3 | 554 |
| 40 | | 16 | 15.2 | 18.5 | 18.5 |
| 10 | 2 | 8.16 | 7.09 | 11.1 | >1000 |
| 20 | | 10.5 | 61.3 | 8.87 | >1000 |
| 30 | | 12.5 | 858 | 13.7 | >1000 |
| 40 | | 9.99 | 70.9 | 20.1 | 250 |

The W/O microemulsion of Table 7 was formulated with 59.94% w/w diesel as the hydrocarbon phase, 13.23% w/w of TOFA as the fatty acid phase, 2.17% w/w MEA as the first additive, 4.7% hexanol as the second surfactant and 19.96% w/w water phase with the KCl concentration in the aqueous solution varying between 0.5% w/w to 2.00% w/w. The duration of the test in Table 7 was 16 hours at a pressure of 150 psi.

The results of Table 7 show that the W/O microemulsion of the present invention is dynamically stable in practically all of the ranges of KCl and water evaluated. The W/O microemulsion is only destabilized, i.e. NTU>1000, after high temperature aging in the 10% w/w to 30% w/w water content and 2% w/w KCl concentration. At a temperature of 200° F. further testing revealed that the W/O microemulsion of the present invention exhibited a formation damage of 2.9% with 40% w/w water and 2% w/w KCl when the tests were run with crude oil of 11° API and a permeability of 250 mD.

Therefore, the W/O microemulsion of the present invention shows a high thermal stability of up to 250° F., a formation damage of less than about 3% under dynamic well conditions including downhole well pressures and high stability in the presence of varying water volumes and saline concentrations.

The on site preparation of well servicing fluids that are O/W macroemulsions, W/O macroemulsions or W/O microemulsion by varying the parameters of the formulation constituents and the method of making the emulsion eliminates the need to purchase, transport and store large quantities of prefabricated O/W and W/O well servicing fluids. The components of the present invention, the water phase, the hydrocarbon phase, and the surfactant phase are easily stored and readably accessible at the well drilling location. Since the creation of these well servicing fluids depends upon the concentration of the surfactant phases, the saline concentration of the water phase, and the preparation procedures employed, preparation of the emulsions on site can be on an as needed basis. Furthermore, the use of a single mixing tank to create the formulation emulsion desired results in an efficient switch between the creation of differing well servicing fluids, i.e. O/W macroemulsions, W/O macroemulsions and W/O microemulsions.

It is to be understood that the invention is not limited to the illustrations described and shown herein, which are deemed to be merely illustrative of the best modes of carrying out the invention, and which is susceptible of modification of form, size, and arrangement of parts and details of operation. The invention is intended to encompass all such modifications which are within its spirit and scope as defined by the claims.

What is claimed is:

1. A method for selectively preparing different types of emulsions, comprising of the steps of:
communicating a mixing tank with a source of each of a hydrocarbon phase, a water phase, a fatty acid mixture, a first additive and a second additive;
determining a selected emulsion to prepare selected from the group consisting of oil-in-water (O/W) macroemulsions, water-in-oil (W/O) macroemulsions and water-in-oil (W/O) microemulsions; and
if the selected emulsion is the oil-in-water (O/W) macroemulsion, mixing the hydrocarbon phase, the water phase and a surfactant comprising the fatty acid mixture ionized with at least 0.25% w/w of the first additive in the mixing tank to form the oil-in-water (O/W) macroemulsion, wherein the mixing step is carried out at a mixing speed of between about 5,000 rpm and about 8,000 rpm for at least 10 minutes; and
if the selected emulsion is the water-in-oil (W/O) macroemulsion, mixing the hydrocarbon phase, the water phase, and a surfactant comprising the fatty acid mixture ionized with less than 0.13% w/w of the first additive in the mixing tank to form the water-in-oil (W/O) macroemulsion, wherein the mixing step is carried out at a mixing speed of between about 5,000 rpm and about 8,000 rpm for at least 10 minutes; and
if the selected emulsion is the water-in-oil (W/O) microemulsion, mixing the hydrocarbon phase, the water phase, a first surfactant comprising the fatty acid mixture ionized with at least 2% w/w of the first additive and a second surfactant comprising at least about 4% w/w of the second additive to form the water-in-oil (W/O) microemulsion, wherein the mixing step is carried out at a mixing speed of between about 400 rpm and about 500 rpm and wherein the communicating step communicates the mixing tank with all ingredients to make each of the oil-in-water (O/W) macroemulsion, water-in-oil (W/O) macroemulsion and water-in-oil (W/O) microemulsion, and wherein the selected emulsion is the water-in-oil (W/O) microemulsion, and wherein the mixing step comprises:
mixing the hydrocarbon phase and the fatty acid mixture for a time of at least 3 to 5 minutes;
adding at least 2% to about 2.7% w/w of the first additive;
mixing the hydrocarbon phase, the fatty acid and the first additive for a time of at least 1 to 3 minutes;
adding the water phase;
mixing the hydrocarbon phase, the fatty acid, the first additive and the water phase for a time of at least 1 to 5 minutes; and
adding at least about 4% w/w of a second surfactant to produce the water-in-oil (W/O) microemulsion.

2. The method of claim 1, wherein the hydrocarbon phase comprises mineral oil, paraffinic oil, fuel oil and mixtures thereof.

3. The method of claim 1, wherein the water phase comprises up to 2% w/w potassium chloride (KCl).

4. The method of claim 1, wherein the water phase comprises between about 0.5% w/w and 2% w/w potassium chloride (KCl).

5. The method of claim 1, wherein the fatty acid mixture comprises C16-C22 fatty acids and mixtures thereof.

6. The method of claim 1, wherein the fatty acid mixture is tall oil fatty acid (TOFA).

7. The method of claim 1, wherein the concentration of the fatty acid mixture is about 1.0% w/w to about 2% w/w.

8. The method of claim 1, wherein the first additive is hygroscopic.

9. The method of claim 1, wherein the first additive is selected from the group consisting of monoethanolamine (MEA) and potassium hydroxide alkalines (KOH).

10. The method of claim 1, wherein the concentration of the first additive to obtain the O/W macroemulsion is between 0.25% w/w and about 1.2% w/w.

11. The method of claim 10 wherein the first additive is MEA.

12. The method of claim 1, wherein the O/W macroemulsion is stable at a temperature of up to about 350° F., the W/O macroemulsion is stable at a temperature of up to about 280° F., and the W/O microemulsion is stable at a temperature of up to about 250° F.

13. The method of claim 1, wherein the O/W macroemulsion exhibits a formulation damage of less than about 4%, the W/O macroemulsion exhibits a formation damage of less than about 7%, and the W/O microemulsion exhibits a formation damage of less than about 3%.

14. The method of claim 1, wherein the O/W macroemulsion and the W/O macroemulsion produce stable macroemulsions having droplets that are from about 1 µm to about 10 µm in size, and the W/O microemulsion produces a stable microemulsion having droplets that are from about 100 Å to 700 Å in size.

15. The method of claim 1, wherein the O/W macroemulsion is stable in an environment of up to about 5% w/w KCl, the W/O macroemulsion is stable in an environment of up to about 2% w/w KCl, and the W/O microemulsion is stable in an environment up to about 2% w/w KCl.

16. The method of claim 1, wherein the W/O macroemulsion is stable in an environment of about 0.5% w/w KCl.

17. The method of claim 1, wherein the O/W macroemulsion contains a ratio of oil:water in the range of about 70:30 w/w to about 50:50 w/w, the W/O macroemulsion contains a ratio of oil:water in the range of about 60:40 w/w to about 90:10 w/w and the W/O microemulsion contains a ratio of oil:water in the range of about 60:40 w/w to about 90:10 w/w.

18. The method of claim 1, wherein the selected emulsion is the water-in-oil (W/O) microemulsion, and the second surfactant is a C4-C6 alcohol at a concentration of at least about 4% w/w to about 4.7% w/w.

19. The method of claim 1, wherein the selected emulsion is the water-in-oil (W/O) microemulsion, and the first additive is MEA.

20. The method of claim 1, wherein the selected emulsion is the water-in-oil (W/O) microemulsion, and the concentration of the fatty acid mixture is about 10% w/w to about 14% w/w.

21. The method of claim 1, wherein the emulsion is prepared at a location of use.

22. The method of claim 21, wherein the location of use is a well to be treated.

23. The method of claim 22, wherein the fatty acid mixture is tall oil fatty acid.

24. The method of claim 22, wherein the hydrocarbon phase is diesel.

25. The method of claim 22, wherein the concentration of the water phase is about 10% w/w to about 40% w/w.

26. The method of claim 25, wherein the water phase comprises at least 0.5% w/w to 2.0% w/w potassium chloride (KCl).

* * * * *